United States Patent [19]

Kitamura

[11] Patent Number: 4,545,618
[45] Date of Patent: Oct. 8, 1985

[54] HEAD-REST DEVICE

[75] Inventor: Masahiro Kitamura, Akishima, Japan

[73] Assignee: Tachikawa Spring Co., Ltd., Japan

[21] Appl. No.: 582,472

[22] Filed: Feb. 22, 1984

[51] Int. Cl.$^4$ ............................................... A47C 1/10
[52] U.S. Cl. ................................... 297/410; 248/410; 297/391
[58] Field of Search .................. 297/410, 391; 248/410

[56] References Cited

U.S. PATENT DOCUMENTS

| | | | |
|---|---|---|---|
| 2,637,313 | 5/1953 | White | 248/410 |
| 3,563,602 | 2/1971 | Ohta | 297/410 |
| 3,672,722 | 6/1972 | Murcott | 297/410 X |
| 4,128,274 | 12/1978 | Schmedemann | 248/410 |

FOREIGN PATENT DOCUMENTS

| | | | |
|---|---|---|---|
| 0144135 | 9/1982 | Japan | 297/410 |
| 104252 | 4/1942 | Switzerland | 248/410 |

*Primary Examiner*—James T. McCall
*Attorney, Agent, or Firm*—Cushman, Darby & Cushman

[57] ABSTRACT

A head-rest device is disclosed which comprises a head-rest stay, a head-rest holder mounted to a seat back and a lock mechanism provided within the head-rest holder. The head-rest stay is inserted into its associated head-rest holder. The head-rest stay is formed with two or more pairs of slotted recesses on its circumferential surface. Such pair of slotted recesses are located at required intervals in a vertical direction from each other and correspond to each other in a staggered manner. An engagement body, which has a required thickness and is formed with a stay insertion bore having a diameter substantially equal to that of the head-rest stay, is inclinably inserted via a spring into the head-rest holder. A retaining member is also provided which is capable of retaining the engagement body in its inclined position in which the upper and lower edge portions of the stay insertion bore are engaged with a pair of slotted recesses respectively. The lock mechanism is formed by inserting the spring, engagement body and retaining member into the head-rest holder in this order.

9 Claims, 3 Drawing Figures

U.S. Patent   Oct. 8, 1985   Sheet 1 of 2   4,545,618
FIG. 1
FIG. 3
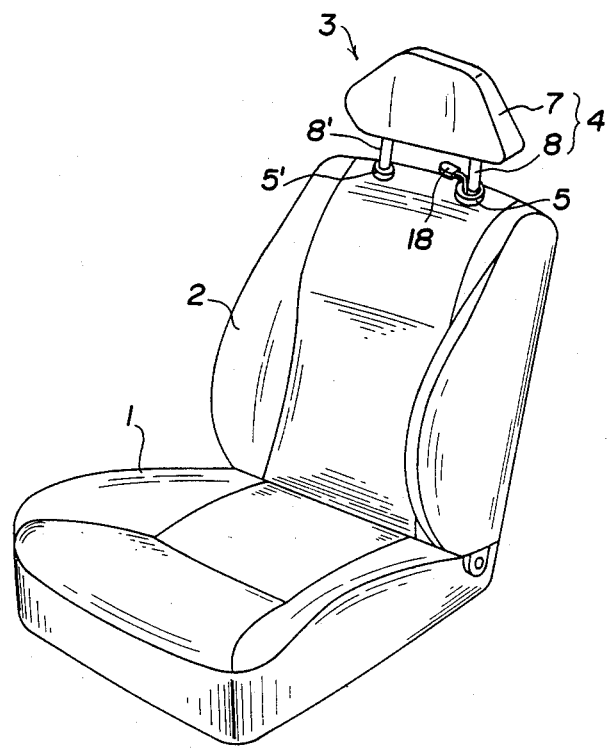
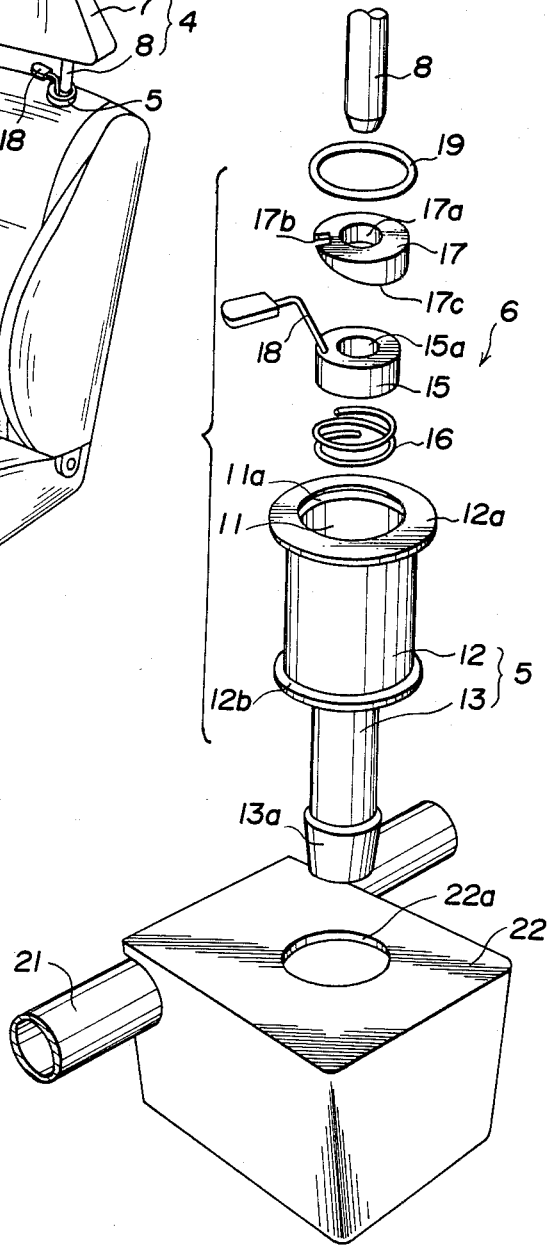

HEAD-REST DEVICE

BACKGROUND OF THE INVENTION

1. Field of the Invention

The present invention relates to a head-rest device for use in a vehicle seat, and, more particularly, to an improved head-rest device which is capable of adjustment in height as required.

2. Description of the Prior Art

When using this type of head-rest, it is necessary to adjust the height of the head-rest in a vertical direction so as to suit various occupants with different sitting heights and this vertical adjustment must be performed manually. In this sense, it is preferred to carry out such adjusting operation using a light force. When shocks are applied to the head-rest device by the head of the occupant in case of a rear-end collision or the like, however, forces tending to downwardly push the head-rest device will be produced and these downward forces are often considerably great. Accordingly, if the head-rest device is so constructed as to be adjustable in height with a small pressure, then its height may be lowered unnecessarily when any shocks are applied to the head-rest and thus the head-rest device cannot maintain the safety of the occupants sufficiently. In other words, such head-rest device is found incapable of satisfying the dual requirements, i.e., the light-pressure operationability and the safety maintenance function simultaneously.

Therefore, there have been conventionally proposed various head-rest devices of a type which includes a lock mechanism provided between head-rest stays and head-rest holders so as to satisfy both of the above-mentioned two conflicting requirements in a synchronous manner, that is, which is easily adjustable in height as well as is capable of maintaining its predetermined position against any possible shocks applied from above. However, such conventional head-rest devices are complicated in structure and the lock mechanisms employed therein have been found rather difficult to operate. In addition, since such prior art head-rest devices include locking means so constructed as to lock the head-rest stays in a downward direction only, when large vibratory loads are applied to the associated seat, the head-rest stays are caused to slide upwardly so that the head-rest cannot be supported in a stable manner.

SUMMARY OF THE INVENTION

Accordingly, it is the object of the present invention to provide an improved head-rest device in which a lock mechanism provided between head-rest stays and their associated head-rest holders to be mounted to a seat back is simplified in structure and is so constructed as to be able to lock the head-rest stays in both directions, i.e., upwardly and downwardly, and also in which such locking can be released by means of a simple operation.

In order to attain this object, according to the invention, each of the head-rest stays is formed on its front and rear and/or right and left, oppositely located circumferential surfaces with a plurality of paired notched recesses which correspond to each other in a staggered manner and are spaced from each other at required intervals in a vertical direction. On the other hand, there is inclinably inserted via a spring through the head-rest holder to be mounted to the seat back an engagement body which has a required thickness and is formed with a stay insertion bore with a diameter approximately equal to that of the head-rest stay. Retaining member is also fitted into the same head-reast holder so as to retain the engagement body in its inclined position so that the upper and lower edge portions of the stay insertion bore can be engaged with said pair of notched recesses in the head-rest stay respectively.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 1 is a perspective view of a vehicle seat employing a head-rest device constructed in accordance with the present invention;

DETAILED DESCRIPTION OF A PREFERRED EMBODIMENT OF THE PRESENT INVENTION

Figure 2:
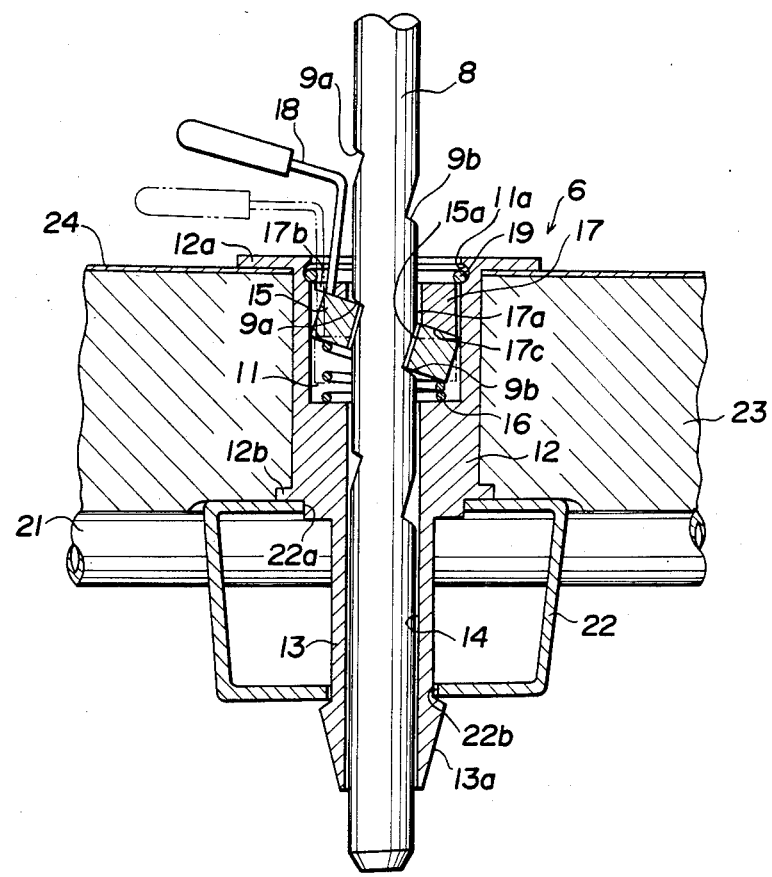
FIG. 2 is a longitudinal section view of main portions of a head-rest device constructed in accordance with the present invention; and, FIG. 3 is an exploded, perspective view of the main portions of the head-rest device of the invention shown in FIG. 2.

FIG. 1 illustrates a vehicle seat which is equipped with a head-rest device constructed in accordance with the present invention. In this figure, reference numerals (1), (2) and (3) designate a seat cushion, a seat back and a head-rest device, respectively. This head-rest device (3) comprises a head-rest body (4), head-rest holders (5)(5') to be mounted onto the upper portion of the seat back (2), and a lock mechanism (6).

Head-rest body (4) comprises a so-called head-rest (pillow body) (7) and two head-rest stays (8),(8') mounted to and extended from the head-rest (7), with one of the head-rest stays (8) being formed on its circumferential surface with two or more pairs of notched or slotted recesses (9a),(9b) which are respectively located on the right and left sides of the circumference surface to correspond to each other in a staggered manner and also are spaced from each other at desired intervals in a vertical direction. One head-rest holder (5), into which the head-rest stay (8) is inserted for supporting, comprises a larger diameter upper half section (12) having a cavity (11) on its upper portion and a cylindrical lower half section (13) having a hollow bore (14). The hollow bore (14) has an inside diameter substantially equal to the outside diameter of the head-rest stay (8) and is communicated with the central portion of the bearing surface of the cavity (11). The larger diameter upper half section (12) includes a larger diameter flange (12a) and a smaller diameter flange (12b) respectively projected from its upper and lower edges, while the upper half section (12) is formed along the mouth edge of the cavity (11) with a groove (11a). On the other hand, the cylindrical lower half section (13) is provided in its lower portion with a tapered engagement edge (13a).

Within the cavity (11) of the larger diameter upper half section (12) of the head-rest holder (5) arranged in the above-mentioned manner, there is contained a lock mechanism (6).

Lock mechanism (6) comprises an engagement body (15) having a required thickness and formed with a stay insertion bore (15a) of a diameter substantially equal to that of the head-rest stay (8), a coil spring (16), and a retaining member (17) which has an axial bore (17a) of a diameter equal to that of the stay insertion bore (15a) and serves to retain the engagement body (15) in its inclined position. This lock mechanism (6) is formed by inserting the coil spring (16), engagement body (15) and retaining member (17) in this order into the cavity (11) of the head-rest holder (5) from below.

Specifically, the engagement body (15) can be inclined in a vertical direction relative to the cavity (11). While the engagement body (15) is maintained in its inclined position in which one side portion of the upper edge and the other side portion of the lower edge of the stay insertion bore (15a) are engaged with the slotted recesses (9a) and (9b) of the head-rest stay (8) respectively, one side portion of the lower edge and the other portion of the upper edge of its outer peripheral surface are brought into contact with the inner surface of the cavity (11). The retaining member (17) is formed to have an inclined lower surface (17c) so as to be able to maintain the engagement body (15) in the last mentioned state. The engagement body (15) is also provided with an operation lever (18) which is projected externally of the mouth of the cavity (11) through a notch (17b) formed in the thinner portion of the retaining member (17), while the retaining member (17) is prevented from coming out of the cavity (11) by provision of a stop ring (19) which can be engaged into the groove (11a) formed in the mouth edge portion of the cavity (11). The engagement body (15) is normally pressed against the inclined lower surface (17c) of the retaining member (17) by means of energization forces of the spring (16) so that it can be held in its desired inclined position relative to the retaining member (17).

The head-rest holder (5) provided with the lock mechanism (6) that is constructed in the above-mentioned manner can be fixed by inserting the cylindrical lower half section (13) into upper and lower supporting bores (22a)(22b) of the head-rest bracket (22) fixed onto the upper surface of the seat back (2) or onto the upper side portion of a back frame (21) for engagement therewith as well as by bringing the lower edge smaller diameter flange (12b) of the larger diameter upper half section (12) into contact with the upper circumferential surface of the upper supporting bore (22a). During this fixation of the head-rest holder (5), the larger diameter upper half section (12) is embedded within a pad member (23), while the upper edge larger diameter flange (12a) is abutted against the upper surface of a top layer (24) to hold down the top layer (24).

Then, the head-rest stay (8) formed with the slotted recesses (9a),(9b) is inserted through the head-rest holder (5) in the above mentioned manner. In insertion of the head-rest stay (8), a lever (18) of the lock mechanism (6) is depressed to place the engagment body (15) horizontally against the energization forces of the spring (16) so that the stay insertion bore (15a) is axially opposed to the axial bore (17a) of the retaining member (17), and then, while maintaining this condition, the head-rest stay (8) is inserted from the axial bore (17a) of the retaining member (17) through the stay insertion bore (15a) of the engagement body (15) into the hollow bore (14) of the cylindrical lower half section (13) of the head-rest holder (5). After the head-rest stay (8) has been inserted to its desired position in this manner, if the operation lever (18) is released from its depressed position, then the engagement body (15) is pushed upwards by the energization forces of the spring (16) to become inclined along the inclined lower surface (17c) of the retaining member (17), while the upper edge one side portion and lower edge other side portion of the stay insertion bore (15a) are respectively engaged with the associated slotted recesses (9a) and (9b) of the head-rest stay (8). As a result of this, the head-rest stay (8) is locked in this position in a vertical direction, i.e., upwardly and downwardly with respect to the head-rest holder (5).

In other words, since it is engaged with the head-rest stay (8) in a inclined manner, the engagement body (15) can be moved integrally with the head-rest stay (8) when the latter is slided axially. When shocks are given to the head-rest (7) and thus a downward sliding force is applied to the head-rest stay (8), the engagement body (15) is pressed against the bottom surface of the cavity (11) of the head-rest holder (5) by means of the spring (16) so that the head-rest stay (8) is prevented from sliding downwards. On the other hand, When an upward sliding force, i.e., a pulling force is applied to the head-rest stay (8), the engagement body (15) is brought into direct contact with the retaining member (17) and the head-rest stay (8) is prevented from sliding upward by means of stopping of the stop ring (19), that is, the head-rest stay (8) is locked in a vertical direction relative to the head-rest holder (5). However, the other head-rest holder (5') and head-rest stay (8') are always maintained in a mutually slidable relationship as with the prior art devices.

In this way, according to the invention, the head-rest stay (8) can be locked relative to the head-rest holder (5) so as to maintain the head-rest (7) in its desired height level.

When a different person occupies the seat, it is necessary to change the height of the head-rest (7) so as to suit the sitting height of the new occupant. In order to alter the height of the head-rest (7), the operation lever (18) of the lock mechanism (6) is again depressed to place the engagement body (15) horizontally against the energization force of the spring (16), with the stay insertion bore (15a) being opposed axially to the axial bore (17a) of the retaining member (17), so that the engagement body (15) is disengaged out of the head-rest stay (8). The head-rest stay (8) is then free to slide relative to the head-rest holder (15). After the head-rest stay (8) has been slided to a new desired height, if the operation lever (18) is released from its depressed position, then the engagement body (15) is again inclined and the upper and lower edge portions of the stay insertion bore (15a) are respectively engaged with other slotted recesses (9a),(9b) of the head-rest stay (8), so that the head-rest stay (8) is again locked. In this manner, according to the invention, it is possible to adjust the height of the head-rest (7) in a plurality of steps as desired.

In the illustrated embodiment of the invention, the supporter of the head-rest (7) is composed of two head-rest stays (8)(8') which are retained by two holders (5)(5'). However, the supporter may be composed of a single head-rest stay and be provided with the above-mentioned lock mechanism (6).

As can be seen from the foregoing description, according to the invention, the head-rest stay is positively locked in the vertical direction with respect to the head-rest holder to be fixed to the seat back and thus is prevented from lowering in height suddenly or from jumping out upwardly even when shocks are given to the head-rest or a large vibratory load is applied to the seat, so that the occupant can be held in safety without causing any possible damages to his or her head portion, neck portion or the like. Also, the head-rest can be adjusted in the vertical direction by a simple operation, i.e., by simply depressing the operation lever. In other words, the head-rest stay can be slided quite smoothly relative to the head-rest holder without applying any direct force thereto so as to set quickly the head-rest in its desired height level, i.e., a position which is suitable for the occupant. In addition, the invention employs a smaller number of parts, is simpler to assemble and is reduced in costs over the conventional devices.

What is claimed is:

1. A head-rest device comprising:
   an elongate head-rest stay;
   a head-rest holder mountable to an upper portion of a seat back for vertically receiving said head-rest stay therethrough; and
   lock means contained within said head-rest holder for removably restricting the vertical movement of said head-rest stay, wherein,
   said head-rest stay includes, on its circumferential surface, means defining plural pairs of vertically spaced-apart slotted recesses, one slotted recess of each said pair of slotted recesses being vertically staggered relative to the other slotted recess of said pair of slotted recesses such that said one and other slotted recess for each said pair establish a respective engagement portion which is angularly inclined relative said head-rest stay;
   said lock means including,
   (i) an engagement body defining a stay-insertion bore having a diameter substantially equal to that of said head-rest stay for slidably receiving said head-rest stay, said bore establishing a pair of engagement edge portions respectively selectively engageable with said one and other slotted recesses of a predetermined slotted recess pair, said engagement body being movable between (a) an engaged position wherein said engagement body is in an angularly-inclined relationship to said head-rest stay to effect respective engagement between said pair of engagement edge portions and said one and other slotted recesses of said predetermined slotted recess pair thereby preventing vertical adjustment of said head-rest stay, and (b) a disengaged position wherein said pair of engagement edge portions are disengaged from said one and other slotted recess of said predetermined slotted recess pair to permit said head-rest stay to be slidable relative said base,
   (ii) an externally-projecting operation lever to permit said engagement body to be manually moved between said engaged and disengaged positions, and
   (iii) retaining means for retaining said engagement body in said inclined engaged position.

2. The head-rest device as in claim 1, wherein said head-rest holder defines a cavity in an upper portion thereof, and wherein said engagement body and retaining means are housed within said cavity.

3. The head-rest device as in claim 1, wherein said engagement body further defines upper and lower peripheral edges wherein, while said engagement body is in said inclined engaged position, a portion of said lower edge and a portion of said upper edge of said engagement body are in contact with said cavity.

4. The head-rest device as in claim 1 wherein said retaining means defines an inclined lower surface for retaining said engagement body in said inclined engaged position.

5. The head-rest device as in claim 1, further comprising a bracket mountable to a back frame of the seat back wherein said head-rest holder is inserted into and engaged with said bracket.

6. A head-rest device as in claim 1 wherein said lock means further includes biasing means for biasing said engagement body into said inclined engaged position.

7. A head-rest device comprising:
   a head-rest holder;
   an elongate head-rest stay received in said holder for slidable movement along an insertion axis relative thereto; and
   lock means for preventing said slidable head-rest stay movement by removably locking said head-rest stay in at least one position relative to said head-rest holder, said lock means including,
   (i) means defining at least one pair of vertically-staggered recessed surfaces in said head-rest stay for establishing said at least one position, said pair of recessed surfaces together defining an engagement portion of said head-rest stay which is angularly inclined relative to said insertion axis;
   (ii) engagement means defining a central bore for slidably receiving said head-rest stay and having a pair of vertically-staggered engagement edge portions for respective interengagement with said pair of recessed surfaces; and
   (iii) lever means connected to said engagement means for permitting manual movement of said engagement means between (a) an engaged position wherein said engagement means is angularly inclined relative said insertion axis so as to be parallel to said engagement portion to cause respective interengagement between said pair of recessed surfaces and said pair of engagement edge portions to thereby lock said head-rest stay in said at least one position, and (b) a disengaged position wherein said bore is aligned with said insertion axis to thereby effect respective disengagement of said pair of recessed surfaces and said pair of engagement edge portions so that said head-rest stay is slidably movable within said central bore.

8. A head-rest device as in claim 7 wherein said lock means further includes retaining means defining a lower surface parallel to said angularly-inclined enagement portion for retaining said engagement means in said inclined engaged position.

9. A head-rest as in claim 7 wherein said lock means further comprises biasing means for biasing said engagement means into said engaged position.

* * * * *